Figure 1:
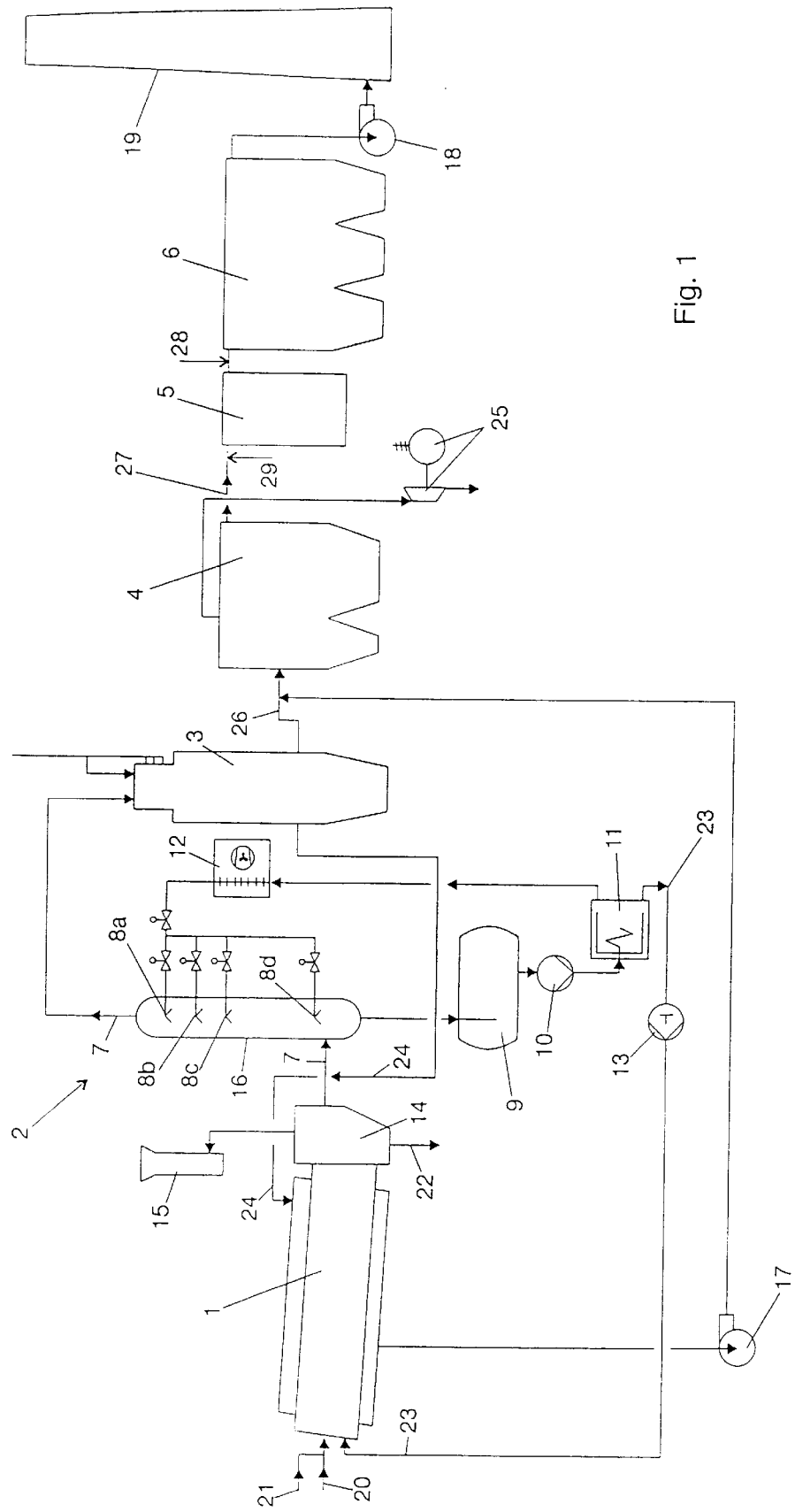

United States Patent [19]
Schmidt

[11] Patent Number: 6,018,090
[45] Date of Patent: Jan. 25, 2000

[54] PROCESS AND PLANT FOR THE THERMAL TREATMENT OF WASTE MATERIAL

[76] Inventor: Rüdiger Schmidt, Am Waldrand 33, D-81477 Munchen, Germany

[21] Appl. No.: 08/913,910

[22] PCT Filed: Mar. 14, 1996

[86] PCT No.: PCT/EP96/01085

§ 371 Date: Sep. 24, 1997

§ 102(e) Date: Sep. 24, 1997

[87] PCT Pub. No.: WO96/31735

PCT Pub. Date: Oct. 10, 1996

[30] Foreign Application Priority Data

Apr. 5, 1995 [DE] Germany ............................ 195 12 785

[51] Int. Cl.[7] .............................. A62D 3/00; C01B 21/00; B01J 8/00; F23J 11/00
[52] U.S. Cl. ........................ 588/205; 423/235; 423/239.1; 110/345; 110/346; 110/216; 422/172
[58] Field of Search ................................ 423/235, 239.1; 588/205; 422/172, 170; 165/111; 110/345, 346, 216

[56] References Cited

U.S. PATENT DOCUMENTS

| 4,206,186 | 6/1980 | Holter et al. | 423/230 |
|---|---|---|---|
| 4,213,945 | 7/1980 | Haese et al. | 423/240 |
| 4,303,477 | 12/1981 | Schmidt et al. | 201/2.5 |
| 4,430,303 | 2/1984 | Linde | 422/170 |
| 4,640,203 | 2/1987 | Wolter et al. | 110/346 |
| 4,744,967 | 5/1988 | Brand et al. | 423/239 |
| 5,257,588 | 11/1993 | Kollmann | 110/345 |
| 5,298,162 | 3/1994 | Niederer et al. | 210/418 |
| 5,376,354 | 12/1994 | Fischer | 423/659 |

*Primary Examiner*—Wayne Langel
*Assistant Examiner*—Melanie C. Wong
*Attorney, Agent, or Firm*—Reising, Ethington, Barnes, Kisselle, Learman & McCulloch, P.C.

[57] ABSTRACT

A method and apparatus for heat treating waste materials including pyrolysing the waste materials in a first heating zone to produce pyrolysis gas containing dust and impurities, removing at least 90% of the dust from the pyrolysis gas, and burning the pyrolysis gas to produce flue gas. The flue gas produced is either immediately denitrogenated non-catalytically or first cooled and then catalytically denitrogenated. Following denitrogenation the flue gas is filtered to purify the gas.

25 Claims, 4 Drawing Sheets

PROCESS AND PLANT FOR THE THERMAL TREATMENT OF WASTE MATERIAL

The invention relates to a method and to apparatus for heat treatment of waste materials.

BACKGROUND OF THE INVENTION

In a method which is known in the art, uninterrupted combustion of the waste materials takes place on a grate, and in addition to considerable quantities of dust a whole range of substances contained in the waste are released in gaseous form, as aerosols or as dusts with the resulting flue gas and have to be separated out or washed out of the flue gas with enormous outlay after utilisation of the heat by way of waste heat boilers. In this case for instance the following purification steps are carried out after the waste heat boiler: dust removal, two-stage scrubbing with evaporation of the washing water above all for the gaseous harmful gases, adsorption stage for dedioxination, denitrogenation apparatus with heat exchanger.

Adherence to the legally prescribed limiting values necessitates such high outlay on the process and thus overall necessitates a very cost-intensive treatment of the residual waste, A method of heat treatment of waste materials is also known from EP-B-0 111 081, in which
a) the waste materials are subjected to pyrolysis in a first heat treatment zone,
b) the pyrolysis gas produced thereby has dust removed to a certain degree in a dust-collecting cyclone,
c) the dedusted pyrolysis gas is burnt in a second heat treatment zone,
d) the flue gas produced in the second heat treatment zone is cooled and energy is recovered, and
e) then the flue gas is purified of harmful substances in a filter by the addition of basic material.

However, the flue gas finally discharged to the exterior via a chimney using this method already fails to meet the legal requirements, particularly with regard to the content of $NO_x$, gaseous harmful gases and heavy metals, for example mercury, and these requirements will be tightened further in the next few years.

It has already been proposed to provide a denitrogenation apparatus at the end of the method chain for reducing the $NO_x$ content in the flue gas.

In processes for heat treatment of waste the catalytic denitrogenation is carried out as a rule in the optimum temperature range of approximately 300° C. However, at the end of the method chain the temperature of the flue gas is usually approximately 70 to 130° C. This means that the denitrogenation apparatus currently in use has to be additionally provided with a heat exchanger with a natural gas heating arrangement in order first of all to heat up the flue gas to the temperature necessary for the denitrogenation and then to cool it again before it is discharged through the chimney.

The arrangement of the denitrogenation apparatus in a part of the method chain which no longer necessitates heating of the flue gases is not possible in the methods of heat treatment of waste materials which are currently known, because during the combustion process trace elements present in the waste, such as arsenic, selenium and the like, are released and would render the denitrogenation plant incapable of functioning after a very short time.

Furthermore, in conventional heat treatment of waste materials sulphur dioxide is produced on a large scale and some of it reacts with the excess atmospheric oxygen to form sulphur trioxide. This compound in turn reacts with the added ammonia or ammonia water or urea which is necessary for the denitrogenation reaction and forms corresponding salts, predominantly ammonium hydrogen sulphate. These salts have strongly adhesive properties and as a result lead to unwanted deposits in the region of the catalyst or the subsequent heat exchangers, pipes, waste heat boilers and other units.

Consequently a SCR denitrogenation apparatus cannot be used immediately after the waste heat boiler—before the flue gas scrubbing units—in conventional plant. It can therefore only be provided at the end of the method chain, when the sulphur dioxide or trioxide content is correspondingly lowered by the flue gas scrubbing.

A further method of denitrogenation, but one which is applied much more rarely in waste technology, is the so-called SNCR method, which is carried out non-catalytically at temperatures between 850 and 1000° C.

When the SNCR method is used in conventional heat treatment apparatus, denitrogenation must be carried out in the waste heat boiler because the effective "temperature window" for this denitrogenation reaction lies in the range from 850 to 1000° C. However, in the region of the boiler the residence time of the flue gas in the "temperature window", which is important for the efficiency of the denitrogenation reaction, is very short, so that the necessary denitrogenation rate must be achieved by super-stoichiometric addition of ammonia. This in turn leads to the resulting products from the flue gas scrubbing having a smell of ammonia which is unwanted for all disposal routes and these products consequently have to undergo costly further treatment.

Also the particularly economical SNCR method cannot be carried out for this reason and for the reasons already mentioned of the formation of ammonium sulphide salt and also the formation of unwanted deposits due to the reaction of the added ammonia in the waste heat boiler with products contained in the dust.

The object of the invention, therefore, is to provide a method and apparatus for heat treatment of waste materials, in which the outlay on apparatus for purification of the flue gas under the prescribed limiting values is substantially reduced by comparison with the known prior art.

SUMMARY OF THE INVENTION

A first method according to the invention for heat treatment of waste materials provides that
a) the waste materials are subjected to pyrolysis in a first heat treatment zone,
b) at least 90%, preferably at least 95% of the dust is removed from the pyrolysis gas produced thereby,
c) the dedusted pyrolysis gas is burnt in a second heat treatment zone,
d) the flue gas produced in the second heat treatment zone is cooled,
e) then the cooled flue gas is denitrogenated catalytically, and
f) finally is purified of harmful substances in a filter by the addition of appropriately reactive additives.

According to the invention the flue gas produced in the second heat treatment zone can be cooled to the optimum process temperature for the denitrogenation. As a result the two heat exchangers provided for heating and cooling in the known denitrogenation apparatus can be avoided.

However, the provision of the catalytic denitrogenation immediately after the cooling of the flue gases produced in the second heat treatment zone is only made possible because at least 90%, preferably 95% of the dust has been removed from the pyrolysis gas from the first heat treatment zone.

In a second method according to the invention for heat treatment of waste materials it is provided that
a) the waste materials are subjected to pyrolysis in a first heat treatment zone,
b) at least 90%, preferably at least 95% of the dust is removed from the pyrolysis gas produced thereby,
c) the dedusted pyrolysis gas is burnt in a second heat treatment zone,
d) then the flue gas produced in the second heat treatment zone is denitrogenated non-catalytically,
e) the denitrogenated flue gas is cooled and
f) finally is purified of harmful substances in a filter by the addition of appropriately reactive additives.

According to a third method according to the invention it is provided that
a) the waste materials are subjected to pyrolysis in a first heat treatment zone,
b) at least 90%, preferably at least 95% of the dust is removed from the pyrolysis gas produced thereby,
c) the dedusted pyrolysis gas is burnt in a second heat treatment zone,
d) the flue gas is cooled and
e) finally is purified of harmful substances in a filter by the addition of appropriately reactive additives.

The third method according to the invention is used in particular when denitrogenation is not necessary in principle in order to adhere to the prescribed limiting values or when the production of $NO_x$ is prevented from the outset by the installation of low-$NO_x$ burners on the combustion chamber.

In all three methods of treatment according to the invention it has proved particularly advantageous if fine-grained basic materials such as calcium hydroxide, calcium carbonate and/or calcium oxide are already added to the waste materials for fixing the acid gaseous harmful substances which are released during the pyrolysis in the first heat treatment zone. As a result in particular the sulphur dioxide or sulphur trioxide concentrations in the flue gas are greatly reduced. Thus the addition of the basic materials also acts as a protection against corrosion for the apparatus parts which come into contact with the pyrolysis gas. Above all the formation of the adhesive ammonium salts is also greatly reduced thereby, so that disruptive incrustations are avoided.

It is only at a concentration of sulphur dioxide in the flue gas of below approximately 200 mg/m$^3$ that the unwanted oxidation of sulphur dioxide to sulphur trioxide can be disregarded, In the tests on which the invention is based it has proved particularly advantageous to use a mixture of activated charcoal or activated coke and bicarbonate in the reactive additives.

THE DRAWINGS

Figure 2:
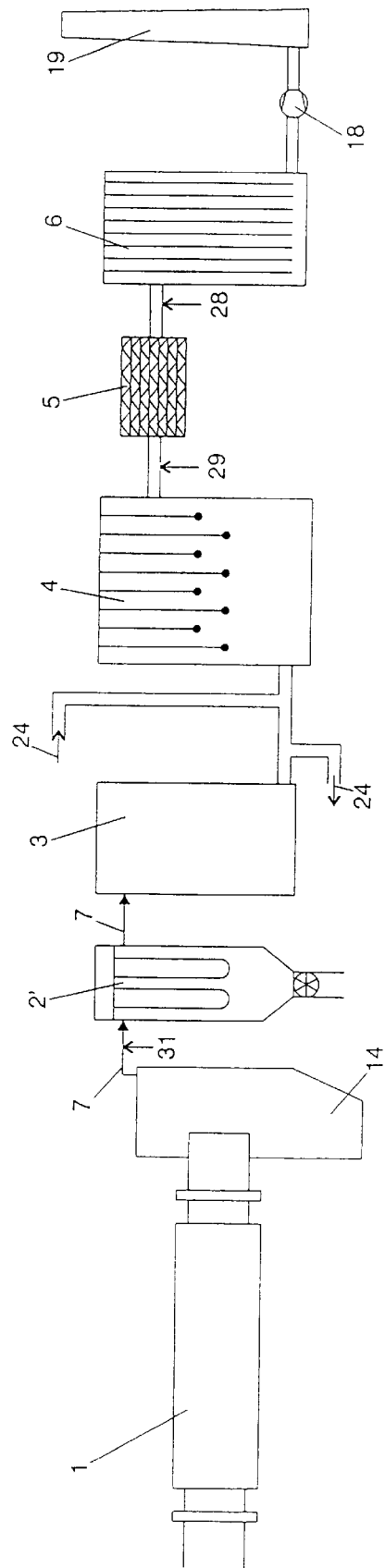
Figure 3:
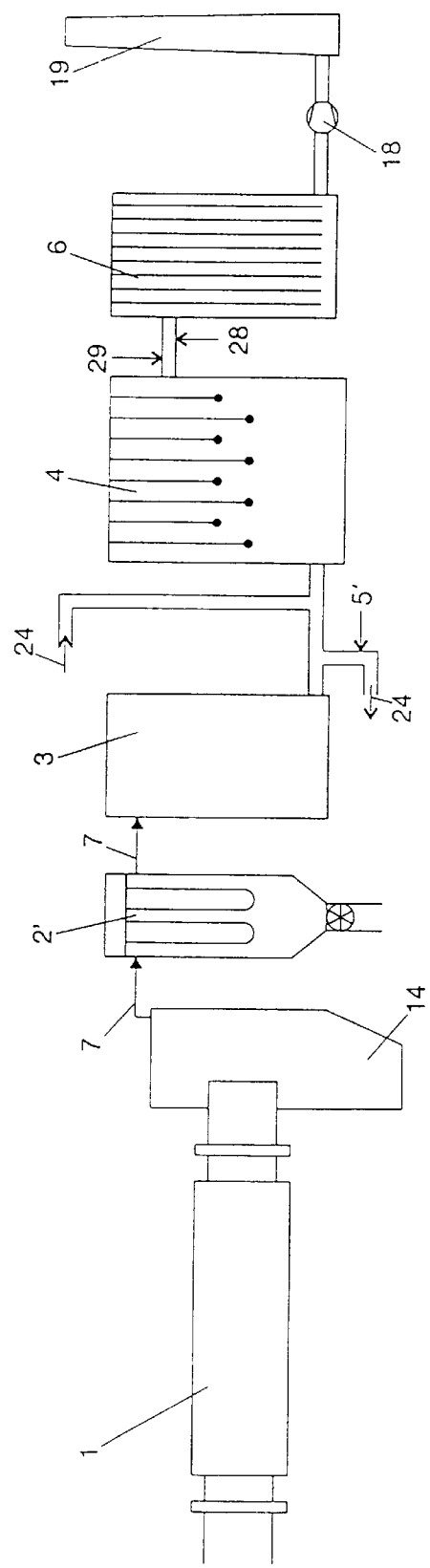
Figure 4:
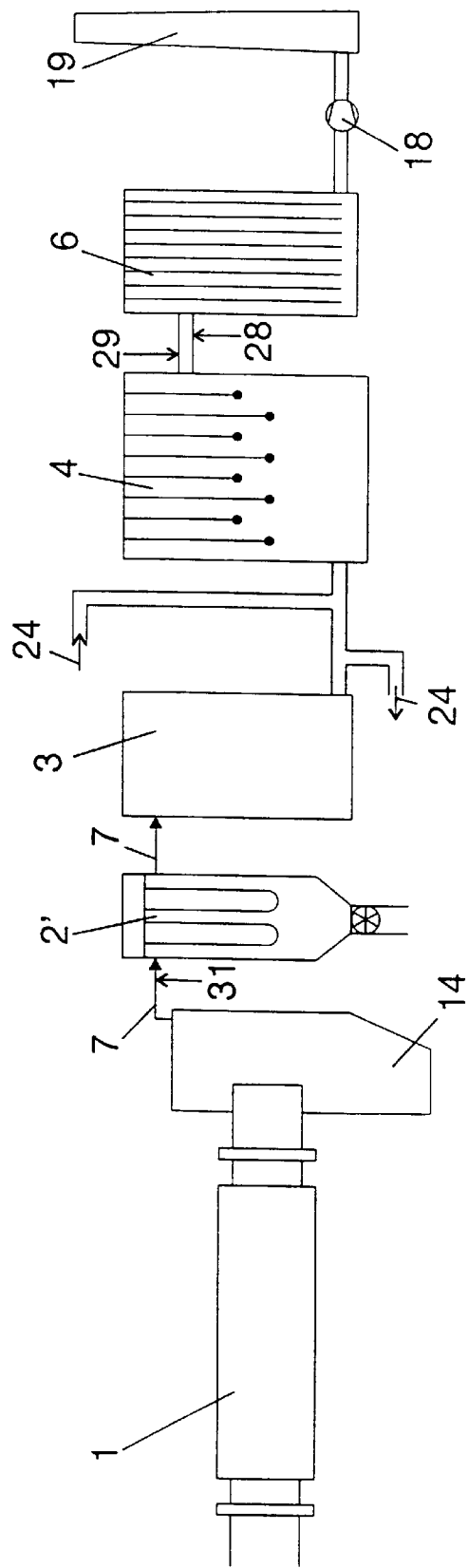

Further embodiments and advantages of the invention are explained in greater detail with reference to the description of several embodiments and to the drawings, in which:

FIG. 1 shows a schematic representation of a first apparatus according to the invention for heat treatment of waste materials, FIG. 2 shows a second embodiment of apparatus according to the invention, FIG. 3 shows a third embodiment of apparatus according to the invention, and FIG. 4 shows a fourth embodiment of apparatus according to the invention.

THE PREFERRED EMBODIMENTS

The embodiments of apparatus according to the invention for heat treatment of waste materials which are illustrated in FIGS. 1 to 3 essentially comprise a rotary kiln 1 which forms the first heat treatment zone, a dust-collecting apparatus 2, 2' forming a dedusting zone, a second heat treatment zone formed by a combustion chamber 3, a cooling zone consisting of a waste heat boiler 4, a denitrogenation apparatus 5, 5' and a filter 6 for gas purification.

The first embodiment according to the invention is explained in greater detail below with reference to FIG. 1.

The dust-collecting arrangement 2 comprises a cooling and scrubbing tower 16 through which pyrolysis gas flows (arrows 7) from bottom to top and into which oil is injected in the various planes 8a, 8b, 8c, 8d. The lower region of the cooling and scrubbing tower 16 is connected to a tank 9 which is connected by way of a pump 10 to a centrifuge 11. One outlet of the centrifuge 11 is connected to a condensate cooler 12, whilst the other outlet of the centrifuge 11 is connected by way of a pump 13 to the inlet end of the rotary kiln 1.

The apparatus according to FIG. 1 also comprises a rotary kiln discharge housing 14, an emergency flare arrangement 15 connected thereto, a turbogenerator 25 connected downstream of the waste heat boiler 4, a flue gas recycling fan 17, an induced draught fan 18 and a chimney 19.

The apparatus according to FIG. 1 is operated as follows according to the method according to the invention:

The waste materials to be subjected to heat treatment are delivered to the inlet end of the rotary kiln 1 (arrow 20). This may optionally take place together with the delivery of fine-grained basic materials such as calcium hydroxide, calcium carbonate and/or calcium oxide which serve for fixing the gaseous acidic harmful substances produced during the low-temperature carbonisation process.

In the rotary kiln 1, which is indirectly heated by means of the flue gases from the combustion chamber 3, the waste materials are degassed at a temperature of 450° C. to 550° C. If basic materials have been added to the waste materials, then a large proportion of the gaseous harmful substances released, such as hydrogen halides and sulphur compounds, are already fixed in the rotary kiln.

The inert residue from low-temperature carbonisation, which has been almost completely degassed, is discharged through the rotary kiln discharge housing 14 by way of wet slag removers (arrow 22) and deposited after metal has been separated off. The carbonisation residue, which still contains approximately 5 to 30% carbon, can also be delivered for example to a heat treatment apparatus suitable therefor, such as for example a coal-fired power station, a gasification plant or the like. This possibility of processing the carbonisation residue is particularly suitable because of its good transportability and storability.

The pyrolysis gas (arrow 7). which has a temperature of approximately 470° C. to 500° C., enters the cooling and scrubbing tower 16 in the lower region thereof and flows therethrough from bottom to top in counterflow to the oil which is injected into various planes 8a, 8b, 8c. 8d as agent.

In the cooling and dust separation zone 2 the pyrolysis gas is cooled to a temperature of at most 250° C., preferably to a temperature between 80 and 180° C. The pyrolysis gas leaves the cooling and scrubbing tower 16 for example with a temperature of 120° C.

Simultaneously the pyrolysis gas is dedusted in the zone 2 to at least 90%, preferably to more than 95%.

The oil injected into the dust separation zone forms fine droplets due to the spraying process. At the same time oil droplets are likewise formed in the dust separation zone due to condensation of oil vapours contained in the pyrolysis gas. The inorganic materials in dust form which are contained in the pyrolysis gas are effectively adsorbed on these oil droplets which are produced partially by spraying and partially by condensation.

Since the pyrolysis gas leaves the dust separation zone 2 with a temperature above the dew point, it is ensured that no water condenses in the cooling and dust separation zone as well as in the pipe leading from this zone to the combustion chamber 3.

The hot dust-laden oil is drawn off with its level regulated out of the lower region of the dust separation zone and delivered by way of the tank 9 and the pump 10 to the centrifuge 11. The hot dust-laden oil is separated by centrifugation into a first phase with a high dust content and a second phase which is largely free of dust. The first phase with a high dust content is delivered by way of the pump 13 to the low-temperature carbonisation zone, i.e. to the rotary kiln 1 (arrow 23). The second phase of the oil, which is largely free of dust, passes from the centrifuge 11 to the condensate cooler 12 and is recooled there to approximately 80° C. before it is again delivered to the planes 8a, 8b, 8c, 8d of the cooling and dust separation zone.

A so-called Venturi scrubber or a similarly constructed arrangement could additionally be provided in the dust separation zone 2 in order additionally to improve the dust separation.

The pyrolysis gas which has been cooled in the cooling and scrubbing tower 16 and largely freed of dust is burnt in the combustion chamber 3 optionally by means of low-$NO_X$ burners with air for combustion delivered. Of the resulting flue gas a first part-stream (arrow 24) is delivered to the rotary kiln 1 for indirect heating. After heating of the rotary kiln 1, by way of the flue gas recycling fan 17 this part-stream of the flue gas is reunited and mixed with the second part-stream of the flue gas collecting in the combustion chamber (arrow 26) before entry into the waste heat boiler 4. The steam generated in the waste heat boiler 4 is bled via the turbogenerator 25. After passing through the waste heat boiler 4 the flue gas (arrow 27) enters the arrangement 5 for catalytic denitrogenation. In so doing, the flue gas has been cooled in the waste heat boiler 4 to the optimum temperature for the catalytic denitrogenation of currently 250 to 300° C. Due to the quite thorough removal of more than 90%, preferably more than 95% of the dust in the dust-collecting arrangement 2, it is possible without any problems to dispose of the denitrogenation catalyst immediately after the waste heat boiler 4. Before the denitrogenation the flue gas has a dust content of at most 500 mg dust/$m^3$, preferably a maximum of 200 mg dust/$m^3$. Therefore it is not necessary to heat the flue gas before delivery.

Downstream the arrangement 5 for catalytic denitrogenation, the flue gas, with appropriately reactive additives (arrow 28) added, passes into the filter 6 which is preferably constructed as a fabric filter. This filter 6 is preferably operated at gas temperatures of 170 to 220° C., so that between the arrangement 5 for catalytic denitrogenation and the filter 6 the flue gas is possibly further cooled for example by the addition of water (arrow 29) or indirectly by preheating of the boiler feed water or with air. Since the greater part of the dust has already been separated off in the cooling and scrubbing tower 16, the filter 6 can be constructed so as to facilitate optimum fixing of all gaseous harmful substances and residual dust. Simple residual dedioxination as well as a reduction in the mercury content is made possible by the addition of activated coke or charcoal. A further problem-free removal of mercury could be achieved by doping, e.g. with sulphur.

In a variant of the dust-collecting arrangement 2 which is not shown in greater detail, two cooling and dust separation zones are provided which are formed by two cooling and scrubbing towers through which pyrolysis gas flows in succession, and the hot dust-laden oil collecting in these two stages is prepared, preferably all together, by dust separation and recycling.

In start-up mode, in the case of fluctuations of throughput and for replacement of the dust-laden phase removed from the oil circuit a correspondingly dosaged quantity of high-boiling oil, preferably diesel or heating oil, is delivered to the oil circuit.

A variant of the apparatus shown in FIG. 1 is illustrated in FIG. 2. In this case the same components are provided with the same reference numerals and are not explained separately again.

The essential difference resides in the dust-collecting apparatus 2', which is constructed here as a hot-gas dust-collecting arrangement with ceramic filter cartridges. In this case the dust is collected in dry form and can be further processed in a simple manner.

In addition, by injection (arrow 31) of further basic materials before the dust-collecting arrangement 2' a further marked reduction in the acidic harmful gases can be achieved without major outlay, since these materials form a coating on the filter material and the pyrolysis with the substances contained therein must penetrate through this coating.

It has proved particularly advantageous in this case if the pyrolysis gas is brought to a higher temperature, for example by heating by 10 to 50° C., before dedusting. As a result the condensation of tars and oils from the pyrolysis gas on the filter cartridges can be reliably avoided.

For the reactive additives delivered at 28 consideration may be given in particular to basic materials, such as sodium bicarbonate as well as potassium compounds and further sodium compounds. This favours the precipitation in the filter of harmful substances as reaction products such as for example sodium chloride and sodium sulphate.

The addition of elemental sulphur, sodium sulphide or the like is also possible as doping material for the mercury precipitation. The addition of activated coke or activated charcoal is also extraordinarily effective as adsorption material.

Finally, FIG. 3 shows a third embodiment of apparatus which differs from the two which are illustrated in FIGS. 1 and 2 essentially in the denitrogenation arrangement 5'. In this embodiment a non-catalytic denitrogenation is carried out immediately after the second heat treatment zone, i.e. after the combustion chamber at temperatures of approximately 800 to 1000° C. In the illustrated embodiment the non-catalytic denitrogenation arrangement 5' is formed by an arrangement for the addition of ammonia or ammonia water or also urea (arrow 5'). In this case the addition takes place particularly advantageously into the first part-stream (arrow 24) which is delivered to the rotary kiln 1 for indirect heating. This ensures the longest possible residence time of the added substance, particularly ammonia, with the flue gas in a temperature window of 850 to 1000° C. In this way the proportion of ammonia to be reacted can be minimised by a near-stoichiometric addition of ammonia. As a result precipitation of residual ammonia in subsequent flue gas scrubbing units is no longer provided or provided on a negligible scale. Moreover the very costly after-treatment of the flue gas scrubbing products for elimination of these chemicals which emit intense odours can be omitted.

Due to the high degree of dedusting in the dust-collecting arrangement 2' the subsequent apparatus parts, particularly the waste heat boiler 4, are not endangered by the addition of ammonia. A particular advantage in this embodiment is also the addition of basic materials, such as calcium hydroxide, calcium carbonate and/or calcium oxide, in the region of the first heat treatment zone, so that the sulphur dioxide or sulphur trioxide fractions can be fixed for the most part before the denitrogenation arrangement 5' and as a result the formation of the strongly adhesive ammonium salts can be avoided.

The further dosaging of basic materials into the pyrolysis gas before the dedusting has an additional effect of fixing harmful gases and promoting free-flowing operation, and these materials form a coating on the filter through which the pyrolysis gas and the substances contained therein must penetrate and thus the further reaction between base and acid harmful gas fractions and precipitation thereof is aided.

The apparatus illustrated in FIG. 3 can of course also be operated with a dust-collecting arrangement 2 as illustrated in FIG. 1.

Finally, FIG. 4 shows a fourth embodiment of apparatus according to the invention. The essential difference from the apparatus according to FIG. 2 resides in the fact that no denitrogenation apparatus is provided here.

In the illustrated embodiment the dedusting is again carried out by a hot gas dust-collecting arrangement. Of course the dust-collecting arrangement 2 illustrated in FIG. 1 can also be used here. The denitrogenation can then be dispensed with particularly if the flue gas discharged via the chimney 19 meets the prescribed limiting values.

The method and apparatus according to the invention as illustrated in FIGS. 1 to 3 are distinguished particularly in that the outlay on apparatus for lowering the $NO_X$ content in the flue gas below the prescribed limiting values is substantially reduced by comparison with the known prior art.

A further extraordinarily positive effect in all methods according to the invention is also to be seen in the fact that due to the splitting in the pyrolysis and combustion zone the design of the combustion chamber can be chosen in such a way as to ensure the reliable destruction of the dioxins and furans contained in the waste. By the homogenisation of the waste during the pyrolysis it is possible—in contrast to conventional methods—to burn the pyrolysis gas with a slight excess of air and thus at relatively high temperatures of above 1200° C. In contrast thereto, the combustion temperature in conventional methods is approximately 850 to 1000° C. Due to the higher temperatures the degree of destruction of all organic compounds and particularly of dioxins and furans is correspondingly higher.

Furthermore, the prior dedusting reliably prevents new formation of dioxins and furans on the waste heat route so that—in contrast to conventional methods—there is no necessity for a dedicated unit for reducing dioxins and furans on the flue gas route.

In the tests on which the invention is based it has proved particularly advantageous to use a mixture of activated charcoal or activated coke and bicarbonate as reactive additives (arrow 28). The quantity and/or composition of this mixture is regulated as a function of the purification value of the flue gas after the filter 6. In this case a continuous measurement of the purification value of the flue gas is usually carried out.

In the apparatus according to the invention the overall outlay on the process for the flue gas scrubbing is substantially reduced by comparison with the conventional apparatus.

Apart from the reduction in the $NO_X$ content, all other relevant emission values are also met, the outlay being drastically reduced by comparison with conventional flue gas scrubbing methods with at least 5 stages.

I claim:

1. A method of heat treating waste materials comprising successively pyrolising said materials in a first heating zone to produce pyrolysis gas containing dust; removing at least 90% of the dust from said pyrolysis gas in a dedusting zone; burning the dedusted pyrolysis gas in a second heating zone to produce flue gas; denitrogenating the flue gas in a denitrogenating zone; cooling the denitrogenated flue gas in a cooling zone; and filtering the denitrogenated flue gas in a filtering zone to remove impurities therefrom.

2. The method according to claim 1 including removing at least 95% of the dust from said pyrolysis gas in said dedusting zone.

3. The method according to either one of claims 1 or 2 wherein said gas is non-catalytically denitrogenated in said denitrogenating zone.

4. The method according to claim 3 including adding appropriately reactive additives to said flue gas as said flue gas passes to said filtering zone.

5. The method according to claim 4 wherein said additives are selected from the class consisting of activated charcoal, activated coke, and bicarbonate.

6. The method according to either one of claims 1 or 2 including cooling said flue gas in said cooling zone to a temperature no greater than 250° C.

7. The method according to claim 6 wherein said flue gas is cooled by injecting oil into said cooling zone.

8. The method according to claim 7 wherein said oil and said gas flow through said dedusting zone in opposite directions.

9. The method according to claim 8 wherein said gas flows upwardly through said dedusting zone.

10. The method according to claim 7 wherein said oil is injected into said dedusting zone at a plurality of spaced apart planes.

11. The method according to claim 7 including passing dust laden oil from said cooling zone to a separating zone and centrifuging said dust laden oil into a first phase having a relatively high dust content and a second phase relatively free of dust.

12. The method of claim 11 including delivering the first phase to said first heating zone and said second phase to said dedusting zone.

13. The method according to claim 12 including cooling said second phase enroute to said dedusting zone.

14. The method according to either one of claims 1 or 2 wherein said gas is cooled in said cooling zone to a temperature of between 120° and 180° C.

15. The method according to either one of claims 1 or 2 wherein said dedusting zone has first and second stages through which said pyrolysis gas flows in succession.

16. The method according to either one of claims 1 or 2 including adding to the waste materials fine grain additives capable of fixing selected acidic substances released from said materials during the pyrolysis thereof in the first heating zone.

17. The method according to claim 16 wherein said additives are selected from the group consisting of calcium hydroxide, calcium carbonate, and calcium oxide.

18. The method according to either one of claims 1 or 2 including delivering heated flue gas to said first heating zone.

19. The method according to either one of claims 1 or 2 including collecting in dry form dust removed from said pyrolysis gas.

20. The method according to either one of claims 1 or 2 including heating said pyrolysis gas passing from said first heating zone to said dedusting zone.

21. The method according to either one of claims 1 or 2 including cooling said flue gas to an optimum filter temperature between the denitrogenation zone and the filtering zone.

22. The method according to either one of claims 1 or 2 including delivering a proportion of the flue gas from said second heating zone to said first heating zone.

23. The method according to either one of claims 1 or 2 wherein the denitrogenating of said flue gas is catalytic.

24. The method according to either one of claims 1 or 2 including introducing to said flue gas between said second heating zone and said cooling zone a substance selected from the class consisting of ammonia, ammonium water, and urea.

25. A method of heat treating waste materials comprising successively pyrolising said materials in a first heating zone to produce pyrolysis gas containing impurities and dust; removing at least 90% of the dust from said pyrolysis gas in a dedusting zone; burning the dedusted pyrolysis gas in a second heating zone to produce flue gas; denitrogenating the flue gas in a denitrogenating zone; adding to the denitrogenated flue gas reactants appropriate for precipitating impurities therefrom; and filtering the flue gas to remove the precipitated impurities.

* * * * *